Jan. 3, 1939. W. M. WHITNEY 2,142,863
DUPLEX WOOD SHAPING MACHINE
Filed Sept. 26, 1936 2 Sheets-Sheet 1

INVENTORS
Wm. M. Whitney
Joseph K. Schofield
BY
ATTORNEY

Jan. 3, 1939.  W. M. WHITNEY  2,142,863
DUPLEX WOOD SHAPING MACHINE
Filed Sept. 26, 1936   2 Sheets-Sheet 2
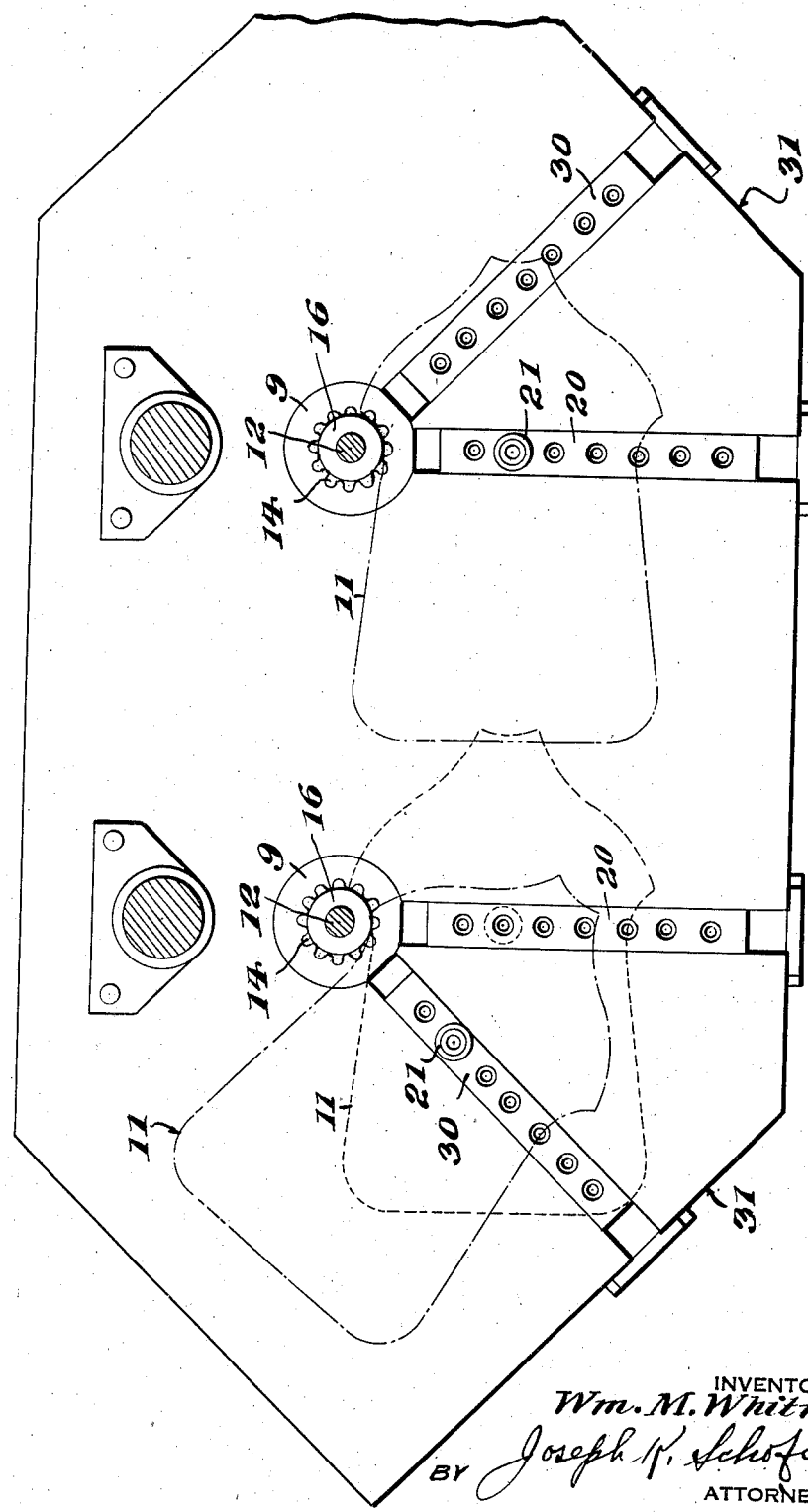
INVENTORS
Wm. M. Whitney
BY Joseph K. Schofield
ATTORNEY Patented Jan. 3, 1939

2,142,863

UNITED STATES PATENT OFFICE 2,142,863

DUPLEX WOOD SHAPING MACHINE

William M. Whitney, Winchendon, Mass., assignor to Baxter D. Whitney & Son, Inc., Winchendon, Mass., a corporation of Massachusetts Application September 26, 1936, Serial No. 102,733

2 Claims. (Cl. 144—145)

This invention relates to wood shaping machines and particularly to machines for this purpose of the general type shown in the patent to Sawyer 1,567,865 granted December 29, 1925. More particularly the invention relates to a duplex shaping machine, each of the two spaced cutter spindles having a plurality of optionally usable work positioning means serving to hold the work pieces and the parts associated with the work pieces normally toward its spindle.

A primary object of the invention is to provide a duplex wood shaping machine with work holding slides optionally usable and positioned to permit the use of the largest possible patterns without one pattern interfering with the other during the shaping operation.

The above feature is accomplished by providing the two work holding slides for each cutter spindle at an angle to each other. The adjacent or inner slides for the two cutter spindles are positioned parallel to each other and most conveniently arranged for the operator when patterns of small and medium sizes are being used. The supplemental slides for the work holding means are placed on the outer side of the parallelly disposed slides. Either slide for each spindle may be used as the requirements of the particular patterns being used may require.

With the above and other objects in view the invention may include the features of construction and operation set forth in the following specification and illustrated in the accompanying drawings.

In the accompanying drawings annexed hereto and forming a part of this specification, I have shown the invention embodied in a vertical duplex wood shaping machine of standard form but it will be understood that the invention can be otherwise embodied and that the drawings are not to be construed as defining or limiting the scope of the invention, the claims appended to this specification being relied upon for that purpose.

In the above mentioned drawings, I have shown but one embodiment of the invention which is now deemed preferable, but it is to be understood that changes and modifications may be made within the scope of the appended claims without departing from the spirit of the invention.

In the drawings:

Fig. 3 is a view in plan with certain parts omitted.

Figure 1:
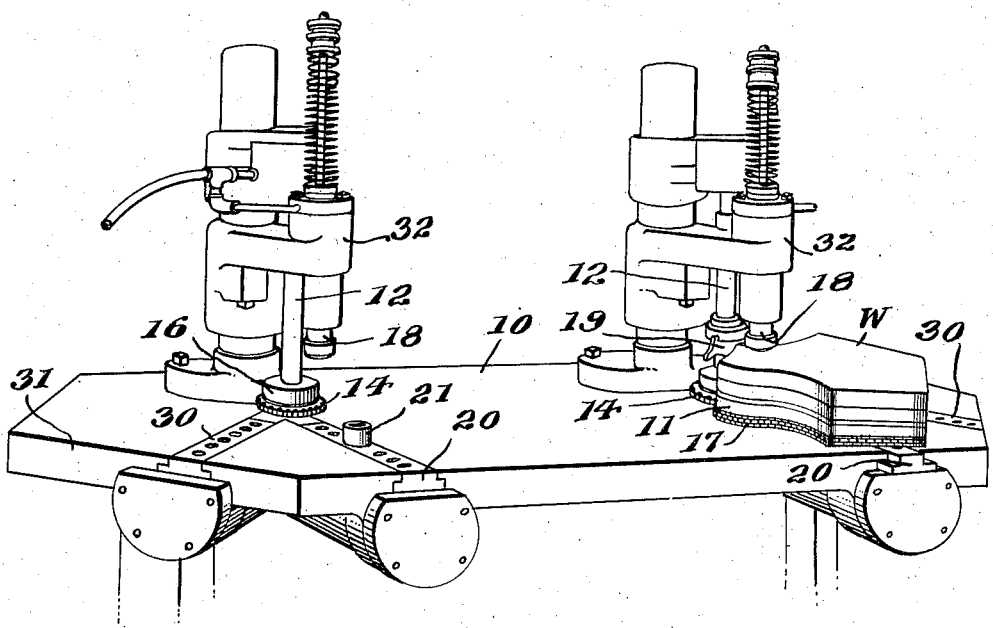
Fig. 1 is a perspective view of a machine embodying the invention.

Briefly and in its preferred aspect, the invention may include the following principal parts: first, a table; second, spaced vertical cutter spindles rotatably mounted and having cutters thereon above the table; third, work guiding and driving means, preferably a roll and sprocket respectively mounted concentric with the cutter spindles and rotated at a relatively slow speed; fourth, patterns having means engaging the guiding and driving means mounted concentric with the spindles and serving to feed the material being shaped in a predetermined path and at a proper speed; fifth, fluid actuated holding means engaging the patterns and normally forcing the pattern toward its spindle, there being two angularly disposed directions of movement of the holding means associated with each cutter spindle, and sixth, pneumatic means to hold the pattern downward against the table but permitting its movement in any direction thereon.

Referring more in particular to the figures of the drawing there is provided a supporting table 10 on which the work W being shaped may be moved about with its pattern 11 in the usual manner.

Figure 2:
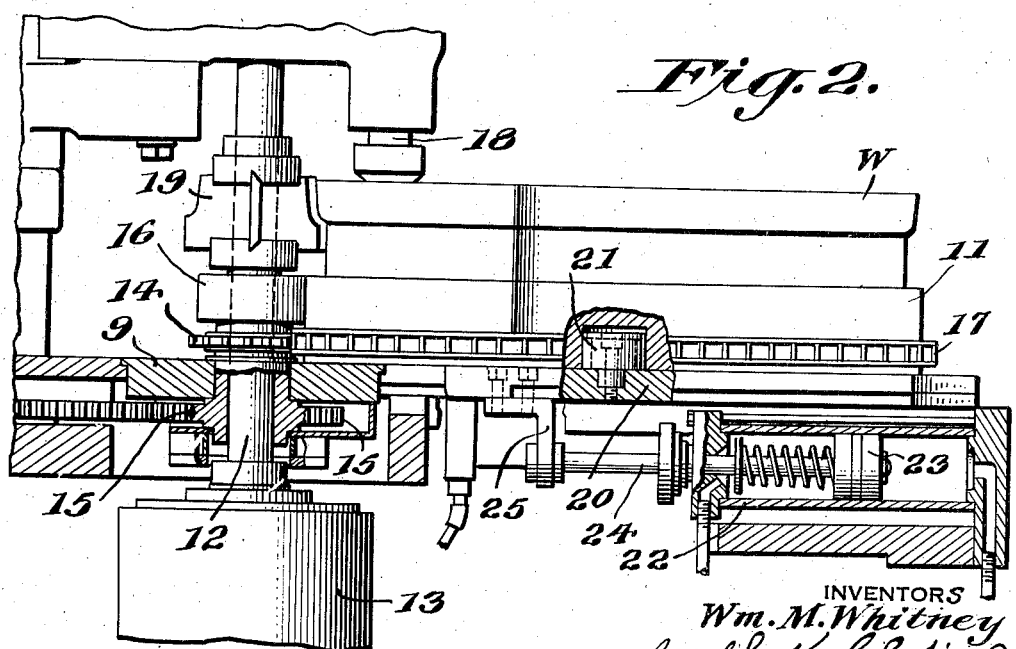
Fig. 2 is a view in elevation, partly in section, of a part of the machine.

A cutter spindle 12 extends above the surface of the table 10 and may be rotated at a high speed as by a motor 13 directly connected thereto below the table. Concentric with the cutter spindle 12 is a toothed wheel or sprocket 14 rotatably mounted and adapted to be slowly rotated by suitable driving connections by a gear 15 below the table 10. Rotatable with this toothed gear or sprocket 14 is a guide roll 16. Preferably and as shown in Fig. 2 the sprocket 14 and gear 15 are mounted on a sleeve surrounding the spindle 12 and rotatable within a supporting bearing in a plate 9.

Work W to be shaped is mounted on a pattern 11 and clamped in position thereon. This pattern 11 has a driving member in the form of a link belt or chain 17 about its periphery adapted to interengage with the toothed wheel or sprocket 14 on sleeve concentric with the cutter spindle 12. On the pattern 11 is the outline including the contours being formed, this outline preferably being of metal or hard wood and adapted to engage the guide roll 16 rotatable on sleeve concentric with the cutter spindle 12.

Pressing against the upper surface of the pattern 11 and work W to maintain the pattern and work against the table 10 is a downwardly forced clamping plunger 18. This plunger 18 permits movements of the pattern and work about the table but prevents upward movement thereof.

To normally force the pattern 11 and work W toward the axis of the cutter spindle 12 and guide roll 16 there is provided a slide 20 mounted in the table 10 and movable directly toward and from the spindle 12. The slide 20 has a roll 21 on its upper surface adapted to engage within a suitable recess within the lower surface of the pattern 11. As the patterns 11 may vary very materially in shape and dimensions provision is made in the slide 20 to secure the roll 21 in any one of several positions along its length.

Below the table 10 and secured in position thereto is a cylinder 22 the axis of which is directly below and parallel to the slide 20. Within the cylinder 22 is a piston 23 having a rod 24 attached thereto and extending from the rear end of the cylinder. The outer end of the rod 24 has a member 25 connecting the rod 24 to the slide 20 so that movements of this piston 23 will be imparted directly to the slide 20. Air under a relatively light pressure may be admitted to the opposite ends of the cylinder 22 the difference in effective area of the forward end serving to normally force the piston 23 and the slide 20 toward the cutter spindle 12. As the fluid admitting means form no part of the present invention further description is not thought to be necessary.

The machine shown in the figures is provided with two cutter spindles 12 spaced a fixed distance apart. Slides 20 are mounted parallel to each other and each movable toward and from its spindle 12. In the operation of a machine upon work pieces W requiring relatively large patterns 11, interference between the patterns on the two slides 20 movable parallelly to each other may occur. This interference is indicated by the dotted and dot and dash lines of the pattern outlines shown in Fig. 3. To avoid this possibility when working on large patterns 11 supplementary slides 30 are provided. As shown in Figs. 1 and 3 there are two slides 20 and 30 respectively provided for each cutter spindle 12, the slides for each spindle being disposed for movement at an angle to each other. The inner slides 20 are parallel to each other and the supplemental slides 30 are on the outside and spaced materially further apart than slides 20. Preferably and as shown the table 10 is cut away at its opposite ends as at 31 so that its oblique front edges are at right angles to the supplemental slides 30.

In operation of the machine the cutter spindles 12 have mounted thereon cutters 19 the form of which corresponds to the form of the work being shaped. Preferably and as shown in Figs. 1 and 2 the cutter spindle 12 is extended upward above the cutter 19 to a bracket 32 within which the cutter spindle may be supported at its upper end.

I claim as my invention:

1. In a duplex wood shaping machine the combination of a supporting table, spaced vertical spindles parallelly disposed thereon, cutters on said spindles, toothed wheels rotatably mounted concentric with said spindles, patterns having work pieces secured thereto and respectively engaging said toothed wheels, a pair of selectively usable slides angularly disposed to each other adjacent each spindle and movable respectively directly toward and from their spindles, connections between a slide and its work carrier permitting turning movement thereof to present successive portions of the work to a cutter, and fluid actuated means normally forcing either slide of the pair of slides adjacent each spindle toward each spindle during the shaping operation.

2. In a duplex wood shaping machine the combination of a supporting table, spaced vertical spindles thereon, cutters on said spindles, toothed wheels rotatably mounted concentric with said spindles, patterns having work pieces secured thereto and respectively engaging said toothed wheels, slides mounted in said table parallel to each other and movable respectively toward and from a spindle, connections between the slides and their work carriers permitting turning movement thereof to present successive portions of the work to a cutter, supplemental slides respectively movable toward and from each of said spindles and spaced on the outer sides respectively of said first mentioned slides and disposed in angular relation thereto, whereby said supplemental slides for each spindle are selectively usable with the first mentioned slides and means normally forcing a slide toward each spindle during the shaping operation.

WILLIAM M. WHITNEY.